United States Patent [19]
Aoki et al.

[11] Patent Number: 5,849,815
[45] Date of Patent: Dec. 15, 1998

[54] INK, INK JET RECORDING METHOD USING THE SAME AND RECORDING EQUIPMENT CONTAINING THE INK

[75] Inventors: Makoto Aoki, Yokohama; Yoshihisa Takizawa, Kawasaki; Yutaka Kurabayashi, Yokohama, all of Japan

[73] Assignee: Canon Kabushiki Kaisha, Tokyo, Japan

[21] Appl. No.: 739,673

[22] Filed: Oct. 31, 1996

Related U.S. Application Data

[63] Continuation of Ser. No. 423,300, Apr. 18, 1995, abandoned, which is a continuation of Ser. No. 134,682, Oct. 12, 1993, abandoned.

[30] Foreign Application Priority Data

Oct. 21, 1992 [JP] Japan ................................. 4-283046

[51] Int. Cl.$^6$ .................................................. C09D 11/02
[52] U.S. Cl. ........................... 523/161; 523/160; 524/396; 524/522; 524/523; 524/556; 106/20 B
[58] Field of Search ..................... 523/161, 160; 524/396, 522, 523, 556; 106/20 B

[56] References Cited

U.S. PATENT DOCUMENTS

| | | | |
|---|---|---|---|
| 4,166,811 | 9/1979 | Marr et al. | 106/308.14 |
| 4,269,627 | 5/1981 | Hwang | 523/161 |
| 4,297,260 | 10/1981 | Ferree, Jr. et al. | 523/161 |
| 4,334,878 | 6/1982 | Cutler et al. | 524/88 |
| 4,567,213 | 1/1986 | Bhatia et al. | 523/160 |
| 4,597,794 | 7/1986 | Ohta et al. | 523/160 |
| 4,838,938 | 6/1989 | Tomida et al. | 106/22 |
| 5,078,790 | 1/1992 | Tochihara et al. | 106/20 |
| 5,080,716 | 1/1992 | Aoki et al. | 106/20 |
| 5,081,470 | 1/1992 | Kurabayashi et al. | 346/1.1 |
| 5,124,201 | 6/1992 | Kurabayashi et al. | 428/323 |
| 5,131,949 | 7/1992 | Tochihara et al. | 106/20 |
| 5,132,700 | 7/1992 | Tochihara et al. | 346/1.1 |
| 5,171,626 | 12/1992 | Nagamine et al. | 428/212 |
| 5,172,133 | 12/1992 | Suga et al. | 106/23 |
| 5,221,330 | 6/1993 | Matsumoto et al. | 106/2 |
| 5,229,786 | 7/1993 | Suga et al. | 346/1.1 |
| 5,380,358 | 1/1995 | Aoki et al. | 106/20 R |
| 5,427,611 | 6/1995 | Shirota et al. | 106/22 A |
| 5,439,515 | 8/1995 | Kurabauyashi et al. | 106/20 D |
| 5,621,447 | 4/1997 | Takizawa et al. | 347/88 |
| 5,623,294 | 4/1997 | Tarizawa et al. | 106/20 B |
| 5,734,403 | 3/1998 | Suga et al. | 347/101 |

FOREIGN PATENT DOCUMENTS

| | | |
|---|---|---|
| 044378A1 | 1/1982 | European Pat. Off. . |
| 0059827 | 9/1982 | European Pat. Off. . |
| 0376284 | 7/1990 | European Pat. Off. . |
| 0581135A1 | 2/1994 | European Pat. Off. . |
| 55-42858 | 3/1980 | Japan . |
| 55-80477 | 6/1980 | Japan . |
| 62-30169 | 2/1987 | Japan . |
| 4170478 | 6/1992 | Japan . |
| WO92/10547 | 6/1992 | WIPO . |

OTHER PUBLICATIONS

Derwent Abstract No. 81–95631D for JP–A–145962.
Derwent Abstract No. 92–254006 for JP–A–170478.
The Condensed Chemical Dictionary, Seventh Edition, Copyright 1966 by Reinhold Publishing Corporation. pp. 747, 744, 362, 363.

*Primary Examiner*—Vasu Jagannathan
*Assistant Examiner*—Alga Asinovsky
*Attorney, Agent, or Firm*—Fitzpatrick, Cella, Harper & Scinto

[57] ABSTRACT

An ink including a dye; a liquid medium for dissolving the dye; and a polymer, wherein the surface tension and the viscosity of the ink respectively are $26\times10^{-5}$ N/cm to $40\times10^{-5}$ N/cm and $0.7\times10^{-3}$ Pa·s to $12\times10^{-3}$ Pa·s, and the forward contact angle with respect to a recording medium, on which an image will be printed, ranges from 60° to 180° at 25° C. An ink jet recording method and recording apparatus employing the ink are also disclosed.

28 Claims, 5 Drawing Sheets

(a) EXTENSIVE WETTING
(b) IMMERSION WETTING

INK, INK JET RECORDING METHOD USING THE SAME AND RECORDING EQUIPMENT CONTAINING THE INK

This application is a continuation of application Ser. No. 08/423,300 filed Apr. 18, 1995, which is a continuation of application Ser. No. 08/134,682 filed Oct. 12, 1993, now abandoned.

BACKGROUND OF THE INVENTION

1. Field of the Invention

The present invention relates to a novel ink enabling a high quality recorded image to be obtained which exhibits a high density and satisfactory fixation characteristics and which is capable of preventing generation of color-mixture bleeding of color ink when it is used to record data on a non-coated paper, that is, a so-called plain paper, such as wood-free paper, medium-quality paper or bond paper which is being generally used in offices and schools, and to an ink jet recording method using the ink and recording equipment containing the ink.

2. Related Background Art

Ink for use in an ink jet recording operation adapted to plain paper must have satisfactory performance, such as printing performance exemplified mainly by fixation characteristics, optical density (OD) and the quality of the printed image, the reliability and discharge performance exemplified by discharge stability, discharge speed, frequency response and initial discharge characteristics.

Since the foregoing characteristics oppose one another, ink capable of simultaneously satisfying all of the required characteristics cannot easily be obtained.

In recent years, an ink jet recording apparatus for recording color images on plain paper by using a plurality of color inks has been developed. However, recording on the plain paper while making use of a plurality of color inks encounters problems of unsatisfactory image optical density (OD) and excessive bleeding occurring in boundaries of adjacent ink dots formed on the paper.

Japanese Patent Laid-Open Application No. 62-30169 discloses a method capable of improving fixation by making use of ink containing lower alkylene glycol monoacryl ether. On the other hand, Japanese Patent Laid-Open Application No. 55-80477 discloses a technology capable of preventing ink bleeding in the horizontal direction of the paper surface by using carboxymethyl cellulose.

Although the foregoing methods satisfy the required fixation and the quality of the printed image, their arrangement for preventing irregular penetration by improving the affinity between the ink and the paper to enlarge the penetration force, causes unsatisfactorily low OD because the ink undesirably excessively penetrates the paper in the direction of the depth as well as the surface of the paper.

Japanese Patent Laid-Open Application No. 55-42858 discloses a technology using a surface active agent, which has specific surface tension, to prevent bleeding and blur occurring at the time of printing another color ink in a superposed manner. However, ink using a surface active agent of the foregoing type suffers from a low OD because the ink penetrates deeply into the paper after printing has been completed.

Japanese Patent Laid-Open Application No. 4-170478 discloses ink of a type having a large initial contact angle and a large surface tension in order to prevent irregular penetration of ink on the plain paper. However, use of ink of the foregoing type to obtain an image having a high OD requires enlarging the quantity of the ink supply. As a result, the fixation and bleeding resistance deteriorate.

As described above, the conventional technology cannot simultaneously satisfy high OD, excellent fixation while also preventing bleeding occurring in a boundary portion between adjacent color dots of different colors on the paper.

SUMMARY OF THE INVENTION

Accordingly, an object of the present invention is to provide ink which is adaptable to a recording operation using color ink and plain recording paper and with which a high OD image can be obtained, which exhibits excellent fixation and with which bleeding can be prevented.

Another object of the present invention is to provide ink adaptable to various plain paper sheets while exhibiting excellent printing performance (fixation, OD and quality of the printed image), satisfactory reliability (fixing characteristics), excellent reservation and discharge characteristics (discharge stability, discharge speed, frequency response and initial discharge characteristics), an ink jet recording method which enables high speed recording to be realized and recording equipment using the foregoing ink.

Another object of the present invention is to provide a printed article which exhibits a high density and with which bleeding can be prevented.

In order to achieve the foregoing objects, according to one aspect of the present invention, there is provided an ink including: a dye; a liquid medium for dissolving the dye; and a polymer, wherein the surface tension and the viscosity of the ink respectively are $26 \times 10^{-5}$ N/cm to $40 \times 10^{-5}$ N/cm and $0.7 \times 10^{-3}$ Pa·s to $12 \times 10^{-3}$ Pa·s, and the forward contact angle with respect to a recording medium, on which an image will be printed, ranges from 60° to 180° at 25° C.

According to another aspect of the present invention, there is provided an ink including: a dye and a liquid medium for dissolving or dispersing the dye, wherein the liquid medium comprises an alkali-soluble resin contained by 0.01 to 5.0% by weight of the overall weight of the ink, a basic substance, a polyhydric alcohol and water.

According to another aspect of the present invention, there is provided an ink including: a dye and a liquid medium for dissolving or dispersing the dye, wherein the liquid medium includes an alkali-soluble resin present at 0.01 to 5.0% by weight of the overall weight of the ink, a basic substance, glycol present at 1 to 50% by weight a sulfur-containing organic solvent present at 1 to 50% by weight and water.

According to another aspect of the present invention, there is provided an ink-jet recording method including the steps of providing an ink as described above in a recording apparatus comprising ink discharge orifices, forming droplets of the ink, and discharging the droplets of ink through the ink discharge orifices of the recording apparatus in response to recording signals.

According to another aspect of the present invention, there are provided an ink jet recording apparatus using the foregoing ink, an ink cartridge accommodating the ink, a recording unit, and an ink jet recording apparatus using the ink cartridge and the recording unit.

According to another aspect of the present invention, there is provided an ink-jet recording apparatus including a recording head for discharging ink droplets; an ink cartridge having an ink accommodation portion; and an ink supply portion for supplying the ink from the ink cartridge to the recording head, wherein the ink is formed as described above for other aspects of the present invention.

According to another aspect of the present invention, there is provided a printed article including: a dot image formed on a recording medium, on which an image is printed, wherein D/h is not less than 6 where h is the penetration distance of a single dot in the direction of the depth of the recording medium, on which an image is printed, and the diameter of the dot is D.

Other and further objects, features and advantages of the invention will be appear more fully from the following description.

DETAILED DESCRIPTION OF THE PREFERRED EMBODIMENTS

The operation of ink according to the present invention with respect to a recording medium, on which image will be recorded, will now be described with reference to FIGS. 1 and 2.

Figure 1:
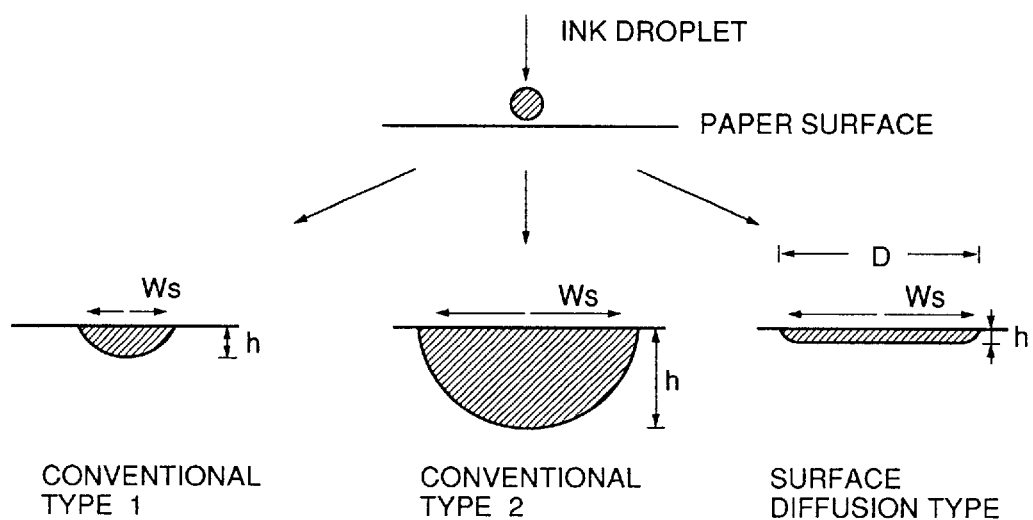
FIG. 1 is a schematic view which illustrates the operation of ink on paper.
Figure 2:
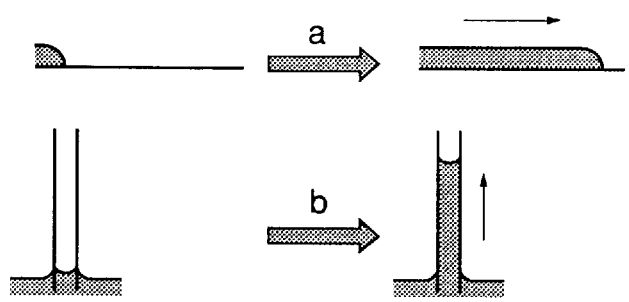
FIG. 2 is a schematic view which illustrates wetting of ink on paper.

As shown in FIG. 1, conventional ink is categorized into Types 1 and 2 in this specification, while ink according to the present invention is called "surface diffusion type ink" hereinafter.

Conventional ink Type 1 displays a small bleeding ratio, that is, realizes a small dot diameter because it does not considerably penetrate (called a "topping type") the paper in the direction of the depth of the paper after the ink droplet reaches the paper surface. Therefore, the ink cannot move anywhere, causing the fixation and the bleeding resistance to deteriorate while suffering from unsatisfactory OD. On the other hand conventional ink Type 2 quickly penetrates the paper (called a "penetration type") in both of the direction of the depth and the direction of the paper surface. Therefore, excellent fixation is obtained and bleeding can satisfactorily prevented. However, the OD deteriorates undesirably.

On the other hand, the surface-diffusion type ink according to the present invention is so designed that it does not considerably penetrate the paper in the direction of its depth but extends in the direction of the paper surface. Therefore, even if the quantity of ink discharge is reduced in order to improve the fixation and the bleeding resistance, a large dot diameter can be realized. As a result, the required fixation and the bleeding resistance and excellent coloring characteristics can simultaneously be satisfied.

If an image is formed by making use of the conventional ink Type 1, D/h is 5.9 (h: 15, D: 88) and 5.3 (h: 15, D: 80) assuming that the distance of penetration in the direction of the depth of the paper is h and the diameter of a dot is D. If the conventional ink Type 2 is used, D/h is 2.8 (h: 45 and D:128). On the other hand, if the ink according to the present invention is used, D/h is 7.2 (h: 15, D: 108), 11.2 (h: 10, D: 112) and 14.5 (h: 8, D: 116).

In order to realize ink of the foregoing type, the present invention is found based on a method for controlling the bleeding ratio and the depth of the penetration into the paper by adjusting the surface tension of the ink and the forward contact angle of the ink with respect to the paper.

The lateral extension of the ink is considered to be categorized into two types consisting of an extension on the surface of the paper (extensive wetting) and an extension in the lateral direction among the fibers of the paper (penetration wetting). Since the surface extension type ink does not considerably penetrate the paper, a consideration is made that the major portion of its penetration is extensive wetting. That is, the extension (bleeding ratio) of the ink is determined depending upon the level of extensive wetting work Ws. That is, the bleeding ratio is in proportion to Ws.

The change (deterioration) of free energy with respect to the extensive wetting work, that is, wetting is expressed as follows:

$$W_S = \gamma_S - \gamma_{LS} - \gamma_L$$

where Ws: extensive wetting work $\gamma_S$: surface tension of a solid (recording medium on which an image is recorded)

$\gamma_{SL}$: surface tension of solid-liquid interface $\gamma_L$: surface tension of liquid (ink)

As can be understood from the equation above, Ws is in inverse proportion to the surface tension of the ink, causing the bleeding ratio to be raised. The fact that the bleeding ratio is high enables the quantity of ink (quantity of discharge) required to realize a desired dot diameter to be reduced. Therefore, the fixation and bleeding resistance can be improved.

However, if a high bleeding ratio is realized, the undesirable extension of the ink in the direction of the depth of the paper prevents the ink to be left in the surface of the paper but causes the dye to be penetrated into the paper. As a result, light scattering occurs due to paper fiber and, accordingly, the coloring efficiency deteriorates. The conventional ink Type 2, which is the foregoing type, has been usually arranged such that a surface active agent or the like is added to improve the wetting characteristics so that the bleeding ratio is raised. However, the undesirable penetration of the ink in the direction of the depth of the paper lowers the OD.

In order to prevent the easy penetration of the ink in the direction of the paper while maintaining a large bleeding ratio, any means for shortening the penetration distance into the paper must be employed.

A consideration is made here about the relationship between the penetration distance h and the physical properties of the ink by making use of Lucas-Washburn's expression.

$$h = \{r \cdot \gamma \cdot \cos\theta \cdot t/(2\eta)\}^{1/2}$$

where h: penetration distance r: radius of fine tube $\gamma$: surface tension of liquid $\theta$: contact angle t: time
θ: viscosity As can be understood from the foregoing expression, the penetration distance h is shortened in proportion to the surface tension of the ink and in inverse proportion to the contact angle. Therefore, the percentage that the dye is left on the paper surface is raised and, accordingly, a high OD can be realized.

Therefore, in order to realize ink of the surface extension type which does not considerably penetrate the paper in the direction of the depth of the paper but extends in the lateral direction, ink must have a small surface tension and be difficult to wet with respect to the paper.

A system having insufficient wettability between ink and a recording medium, on which an image will be printed, is free from irregular bleeding in the form of hair lines occurring due to an influence of projections and pits of the paper and due to a capillary phenomenon taken place between cellulose fibers. Therefore, a regular circular dot can be formed regardless of the type of the paper. The reason for this is that ink does not spontaneously flow through the capillary (the capillary phenomenon does not occur) if the wettability is insufficient Because of the foregoing facts, the ink according to the present invention is arranged such that: the surface tension of the ink at 25° C. is $26 \times 10^{-5}$ N/cm to $40 \times 10^{-5}$ N/cm, preferably $30 \times 10^{-5}$ N/cm to $40 \times 10^{-5}$ N/cm; the viscosity is $0.7 \times 10{-3}$ Pa·s to $12 \times 10^{-3}$ Pa·s, preferably $1 \times 10^{-3}$ Pa·s to $4 \times 10^{-3}$ Pa·s; and the forward contact angle of the ink with respect to the recording medium, on which image will be printed, is 60° to 180°, preferably 90° to 180°. If the surface tension of the ink is smaller than $26 \times 10^{-5}$ N/cm, the force to restore the meniscus after the ink has been discharged through the orifice is weak so that the supply of the ink is too slow and the frequency response deteriorates. If the surface tension of the ink is larger than $40 \times 10^{-5}$ N/cm, the extension wetting work Ws is small, causing the diameter of the formed dot to be reduced. As a result, the coloring characteristics and fixation deteriorate. If the viscosity of the ink deviates from the foregoing range, normal discharge can be constantly obtained in the ink jet recording operation. If the viscosity is larger than $12 \times 10^{-3}$ Pa·s, the viscosity resistance of the ink prevents the extension of the ink droplet on the surface of the recording medium, on which an image will be printed. As a result, the diameter of the formed dot is too small to obtain satisfactory coloring characteristics and fixation.

The term "forward contact angle" is the contact angle made when a liquid droplet moves forwards on the surface of a solid member and is a known term in the subject field.

The reasons why the forward contact angle is considered, rather than the initial contact angle, are that the wettability, including the hysteresis of wetting occurring due to projections and pits of the paper, must be evaluated, and that the ink does not spontaneously penetrate the paper due to the capillary phenomenon or the like but the extension of the dot and the penetration take place due to another external force (energy for discharging the ink droplet and the gravitation). Therefore, it can be considered suitable to use the forward contact angle made at the time of the forward movement of liquid on the surface of a solid member in place of a simple contact angle.

The ink according to the present invention mainly has the following characteristics.
(1) Since a dye is left on the surface of the paper, a high OD can be realized.
(2) Since the diameter of the formed dot is large, satisfactory fixation and coloring characteristics can be realized.
(3) Since an influence of the paper can be eliminated, uniform dots can be realized and a high printing quality can be obtained.
(4) Generation of bleeding can satisfactorily prevented.

The preferred embodiments of the present invention will now be described in detail.

Alkali-soluble resin soluble in alkali is resin of a type which can be dissolved in a water solution in which a basic substance is dissolved. It is preferable to use an alkalisoluble resin which properly reduces the surface tension and which lowers the ink wettability. It is preferable that the alkali-soluble resin be a copolymer of styrene-acrylic acid. Specifically, it is exemplified by: styrene-acrylic acid copolymer; styrene-acrylic acid-acrylic acid alkyl ester copolymer; styrene-maleic acid copolymer; styrene-maleic acid-acrylic acid alkyl ester copolymer; styrene-methacrylic acid copolymer; styrene-methacrylic acid-acrylic acid alkyl ester copolymer; styrene-maleic acid half ester copolymer; vinylnaphthalene-acrylic acid copolymer; and vinylnaphthalene-maleic acid copolymer; or their salts.

The foregoing resins are employed as dispersants for pigment ink. However, if the foregoing resin is used as the dispersant and pigment ink is manufactured by dispersing the resin, the resin is adsorbed to the surface of the pigment to serve simply as a dispersant. Therefore, the effect of reducing the surface tension of the ink cannot be obtained and the effect of lowering the wettability of the ink with respect to the recording medium, on which an image will be printed, cannot be expected.

In an example case, a styrene-acrylic acid copolymer was used at 0.6% by weight to manufacture dye ink and pigment ink each having the same solvent composition. The pigment ink was manufactured by performing a dispersion process. As contrasted with a surface tension of $50 \times 10^{-5}$ N/cm of the pigment ink, the surface tension of the dye ink was $37 \times 10^{-5}$ N/cm. As can be understood from this, they have significantly different surface tensions. That is, the present invention does not use the foregoing resin as the dispersant but uses it for another purpose so that a different effect is obtained.

It is preferable that the acid number of the resin according to the present invention ranges from 100 to 250, and preferably ranges from 130 to 210. If the acid number is less than 100, the solubility of the resin with respect to water deteriorates, causing the fixing characteristics to deteriorate. If the acid number is larger than 250, the affinity with the recording medium, on which an image will be printed, is improved excessively. In this case, the effect of lowering the wettability with respect to the recording medium, on which an image will be printed, deteriorates. It is preferable that the weight average molecular weight of the resin is 3,000 to 50,000, and more preferably 4,000 to 20,000. If the molecular weight deviates from the foregoing range, problems may take place in that the solubility deteriorates, the effect of lowering the wettability cannot be predicted and the viscosity of the ink is raised excessively.

The foregoing resin is manufactured by polymerizing a hydrophobic monomer, such as styrene, and a hydrophilic monomer, such as acrylic acid. In the present invention, the composition ratio of the foregoing monomers is made such that the hydrophobic monomer ranges from 30 to 80% by weight, preferably 43 to 65% by weight and the hydrophilic monomer ranges from 20 to 70% by weight, preferably 35 to 80% by weight.

It is further preferable that a copolymer be employed which is composed of styrene ranging from 30 to 80% by weight, more preferably, 43 to 65% by weight, acrylic acid ranging from 7 to 40% by weight, more preferably 15 to 30% by weight, and ethyl acrylate ranging from 10 to 30% by weight, preferably 12 to 25% by weight.

By adding the foregoing resin to ink by 0.01 to 5% by weight, preferably 0.01 to 2% by weight, more preferably 0.1 to 0.9% by weight, based on the total weight of the ink, the characteristics of the resin can be exhibited satisfactorily. If the quantity of the resin is smaller than the foregoing range, the characteristics of the resin cannot be exhibited. If the quantity is too large, the viscosity is raised excessively. In the ink jet recording method in which heat or pressure is applied to the ink, the stability at the time of discharging the ink deteriorates. A basic substance for dissolving the resin may be a hydroxide compound of alkali metal, such as sodium hydroxide or an organic basic compound, such as monoethanol amine, diethanol amine, triethanol amine, aminomethyl propanol or ammonia or their mixture. It is preferable to employ the hydroxide compound of alkali metal, such as sodium hydroxide or the amine because excellent coloring characteristics and bleeding resistance can be attained.

The coloring material according to the present invention may be any one of water-soluble dyes such as a direct dye, an acid dye, a basic dye and a reactive dye. The foregoing dye is used in the ink at by a quantity ranging from 0.1% by weight to 10% by weight of the overall weight of the ink.

It is preferable that the liquid medium according to the present invention be a mixture of water and water-soluble organic solvent. It is preferable that the water-soluble organic solvent has a low vapor pressure to decelerate the evaporation speed of the water in the ink and has characteristics for dissolving the dye or the like so as to serves as a fixing characteristics improving agent. A preferred water-soluble organic solvent is exemplified by: amide such as dimethyl formaldehyde or dimethyl acetoamide; ketone alcohol such as acetone or diacetone alcohol; ether such as tetrahydrofuran or dioxane; polyalkylene glycol such as polyethylene glycol or polypropylene glycol; alkylene glycol having an alkylene group containing 2 to 6 carbon atoms such as ethylene glycol, propylene glycol, butylene glycol, triethylene glycol, 1,2,6-hexanetriol, thiodiglycol, hexylene glycol or diethylene glycol; glycerol; lower alkyl ether of polyatomic alcohol such as ethylene glycol monomethyl (or ethyl) ether, diethylene glycol monomethyl (or ethyl) ether or triethylene glycol monomethyl (or ethyl) ether; heterocyclic ketone containing nitrogen such as N-methyl-2-pyrrolidone, 2-pyrrolidone or 1,3-dimethyl-2-imidazolidinone; and a compound containing sulfur such as sulforane or dimethylsulfoxide.

As an organic solvent for preserving the ink, that is, preventing the aging of the pH of the ink, it is preferable to use the compound containing sulfur, such as thiodiglycol, sulforane or dimethylsulfoxide, more preferably to use both the foregoing solvent and another glycol. The ink, the pH of which has been lowered due to time, suffers from the decrease of its solubility of the alkali-soluble resin with respect to the ink, causing the fixing characteristics and the discharge characteristics to deteriorate. Since the foregoing compound containing sulfur have a relatively low viscosity and are solvents, which cannot easily be evaporated, the initial discharge characteristics can be improved.

It is preferable that the glycol to be used together with the compound containing sulfur be polyethylene glycol, diethylene glycol, ethylene glycol, propylene glycol or hexylene glycol.

The foregoing water-soluble organic solvent is contained by 0 to 50% by weight, preferably 0 to 20% by weight, more preferably 0 to 10% by weight. If the compound containing sulfur is used together with glycol, it is preferable that the compound containing sulfur be used by 1 to 50% by weight, and glycol be used by 1 to 50% by weight, based on the total weight of the ink.

It is preferable that the content of water in the ink be 40 to 95% of the overall weight of the ink, more preferably 70 to 95%. If the content is smaller than 40% by weight, the viscosity is raised undesirably, bleeding easily takes place on the paper and fixation deteriorates. If it is smaller than 95% by weight, the vapor component is too large and, accordingly, the fixing characteristics deteriorate.

In order to improve the fixing characteristics, a solidification prevention agent, which is different from the conventional water-soluble organic solvent may be used, the solidification prevention agent being exemplified by a compound having an evaporation-restricting effect, a compound for improving the solubility for dissolving the dye and a compound for restricting the rise of the viscosity. The solidification prevention agent is exemplified by: urea; salt of triethylamine such as triethyl amine hydrochloride; salt of triethylamine such as triethanol amine hydrochloride, and a derivative of toluene sulfonamide. It is preferable that the foregoing solidification prevention agent be used by a quantity ranging from 0.1 to 30% by weight.

Use of the foregoing solidification prevention agent prevents clogging even if the quantity of the component (solvent component) except water is reduced considerably. Therefore, satisfactory reliability can be maintained. Since water content is large in the ink, the ink of the recorded article can easily be evaporated to improve the performance at the time of recording an image on plain paper, the performance being the OD, the fixation and the quality of the printed image. Since urea and the like have an effect of restricting the rise of the viscosity, excellent initial discharge characteristics can be realized.

Further, a solvent for improving the fixation is used. If the ink contains the solvent of the foregoing type, excellent drying characteristics can be attained. The solvent from which the foregoing effects can be obtained is exemplified by: alkyl alcohol having 1 to 4 carbons such as methyl alcohol, ethyl alcohol, isopropyl alcohol, n-propyl alcohol, n-butyl alcohol, sec-butyl alcohol, tert-butyl alcohol or isobutyl alcohol; cyclic alkyl alcohol such as cyclohexanol; amide such as dimethyl formamide or dimethyl acetoamide; ketone or ketone alcohol such as acetone or diacetone alcohol; ether such as tetrahydrofuran or dioxyne; heterocyclic ketone containing nitrogen such as N-methyl-2-pyrrolidone, 1,3-dimethyl-2imidazolidinone; glycerol; fatty acid alkylolamide; or N-acylsulfocynate. Since alcohol, such as ethyl alcohol, has a relatively low boiling point, it serves as an agent for enhancing formation of bubbles, which are the discharge energy source of a recording method for discharging ink by giving heat energy to the ink. As a result, an effect can be obtained in that the discharge speed is decreased. On the other hand, the N-methyl-2-pyrrolidone is able to dissolve a polymer. Therefore, an effect can be obtained in that contamination of a heater for generating the heat energy is eliminated and the heater is cleaned, causing the discharge stability to be improved.

It is preferable that the foregoing materials be adequately selected in a range from 0 to 50% by weight of the overall quality of the ink.

It is preferable that a surface active agent is, as an additive, added to the ink according to the present invention. By adding the foregoing material, the fixing characteristics can be improved. However, if the surface active agent is added excessively, the affinity between the ink and the paper is improved excessively, causing problems to rise in that the effect of lowering the wettability due to the polymer is lost and the surface tension is lowered excessively. Therefore, the quantity of the addition should be limited. The surface active agent has a cleaning effect for separating contamination in the ink jet recording head to improve the wettability in the head. Therefore, the discharge stability of the head can be improved.

Examples of the surface active agent having the foregoing performance will now be described.

No. 1: Decaglycerine fatty acid ester $$CH_2-CH-CH_2-O{\left[CH_2-CH-CH_2-O\right]}_{10}CH_2-CH-CH_2$$
$$|\quad\quad|\quad\quad\quad\quad|\quad\quad\quad\quad\quad\quad|\quad\quad|$$
$$OR\quad OR\quad\quad\quad\quad OR\quad\quad\quad\quad\quad OR\quad OR$$

R: acyl group or hydrogen atom

No. 2: Polyoxyethylene castor oil $$CH_2-O-(CH_2CH_2O)_L-\overset{O}{\underset{\|}{C}}-(CH_2)_7CH=CHCH_2CH(CH_2)_5CH_3 \quad O-(CH_2CH_2O)_XH$$

$$CH_2-O-(CH_2CH_2O)_M-\overset{O}{\underset{\|}{C}}-(CH_2)_7CH=CHCH_2CH(CH_2)_5CH_3 \quad O-(CH_2CH_2O)_YH$$

$$CH_2-O-(CH_2CH_2O)_N-\overset{O}{\underset{\|}{C}}-(CH_2)_7CH=CHCH_2CH(CH_2)_5CH_3 \quad O-(CH_2CH_2O)_ZH$$

X, Y, Z, L, M and N are integers of 1 to 50.

No. 3: Polyoxyethylene hard castor oil $$CH_2-O-(CH_2CH_2O)_L-\overset{O}{\underset{\|}{C}}-(CH_2)_{10}CH(CH_2)_5CH_3 \quad O-(CH_2CH_2O)_XH$$

$$CH_2-O-(CH_2CH_2O)_M-\overset{O}{\underset{\|}{C}}-(CH_2)_{10}CH(CH_2)_5CH_3 \quad O-(CH_2CH_2O)_YH$$

$$CH_2-O-(CH_2CH_2O)_N-\overset{O}{\underset{\|}{C}}-(CH_2)_{10}CH(CH_2)_5CH_3 \quad O-(CH_2CH_2O)_ZH$$

X, Y, Z, L, M and N are integers of 1 to 50.

No. 4: Acetylene alcohol ethylene oxide additive $$CH_3-CH-CH_2-\underset{\underset{CH_2-CH_2-OH}{\underset{|}{O}}}{\overset{CH_3}{\underset{|}{C}}}-C\equiv C-\underset{\underset{CH_2-CH_2-OH}{\underset{|}{O}}}{\overset{CH_3}{\underset{|}{C}}}-CH_2-CH-CH_3$$

m+n is an integer of 0 to 50.

No. 5: Polyoxyethylene octyl phenyl ether

No. 6: Polyoxyethylenenonylphenyl ether

No. 7: Polyoxyethylene monostearate

No. 8: The following compounds:

$$CH_3-\underset{\underset{CH_3}{|}}{\overset{\overset{CH_3}{|}}{Si}}-O{\left[\underset{\underset{CH_3}{|}}{\overset{\overset{CH_3}{|}}{Si}}-O\right]}{\left[\underset{\underset{C_3H_6(OC_2H_4)_3(OC_3H_6)OR}{|}}{\overset{\overset{CH_3}{|}}{Si}}-O\right]}\underset{\underset{CH_3}{|}}{\overset{\overset{CH_3}{|}}{Si}}-CH_3$$

No. 9: The following compound $$CH_3-CH_2-\underset{\underset{OH}{|}}{\overset{\overset{CH_3}{|}}{C}}-C\equiv C-\underset{\underset{OH}{|}}{\overset{\overset{CH_3}{|}}{C}}-CH_2-CH_3$$

No. 10: Polyoxyethylene polyoxy propylene

The foregoing surface active agent is used by a quantity ranging from 0.01 to 0.5% by weight with respect to the overall weight of the ink, preferably 0.02 to 0.2% by weight.

It is preferable that the pH of the ink ranges from 8 to 11 at 25° C. If the pH is less than 8, the solubility for solving the resin is unsatisfactory due to the characteristics of the alkali-soluble resin. If the pH is higher than 11, there arises a risk at the time of operation to melt and corrode a portion of the ink jet unit which is in contact with the ink. In particular, an ink jet recording method of a type causing heat energy to act on the ink to form an ink droplet encounters a problem that the life of the heat energy generation source (the heater) is shortened.

The ink according to the present invention is effective to perform a monochrome recording operation using monochrome ink and also effective to perform a full-color recording operation using plural color inks. That is, if an image is printed on plain paper, the conventional technology is able to perform the full color recording operation only by raising the proportion of the penetration of the ink in the direction of the depth of the paper. Therefore, the mixture color printing operation encounters a problem that a large quantity of ink must be used and the resulted coloring characteristics have been unsatisfactory. According to the present invention, the ink cannot easily penetrate in the direction of the depth of the paper and, accordingly, clear mixed color (red, green and blue and the like) can be realized.

As described above, use of the ink according to the present invention causes the printed article to exhibit a high OD, prevents generation of bleeding, enables excellent fixation and quality of printing to be improved, and satisfies all of the required characteristics, such as the fixing characteristics, the discharge stability, the discharge speed, the frequency response and the initial discharge characteristics.

The ink according to the present invention is particularly adaptable to the ink jet recording method for recording an image by discharge an ink droplet due to the effect of the heat energy. The ink may be used in another ink jet recording method and employed as ink for general writing tools.

The method and apparatus capable of performing a recording operation using the ink according to the present invention are a method and an apparatus arranged such that heat energy corresponding to a recording signal is supplied to the ink in a chamber of a recording head and the heat energy is used to generate a droplet.

Figure 3:
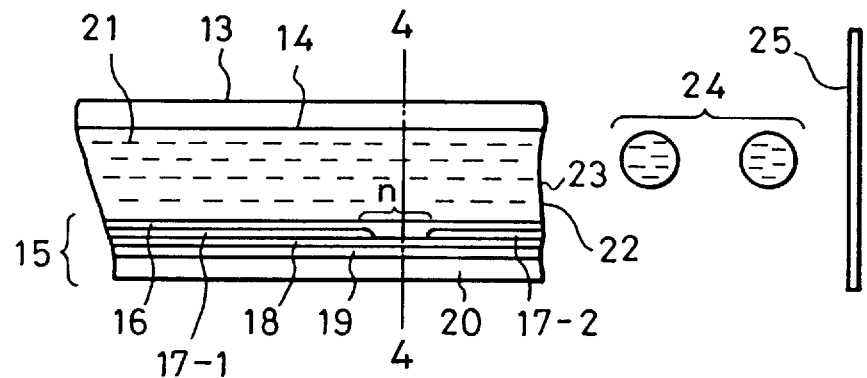
FIG. 3 is a vertical cross sectional view which illustrates a head portion of an ink jet recording apparatus.
Figure 4:
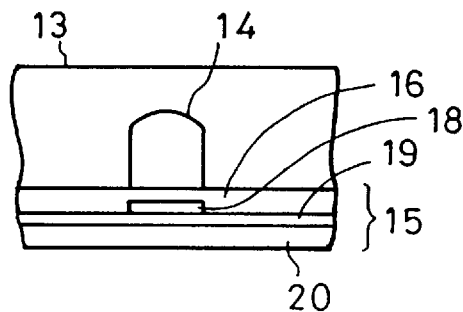
FIG. 4 is a lateral cross sectional view which illustrates a head portion of an ink jet recording apparatus.
Figure 5:
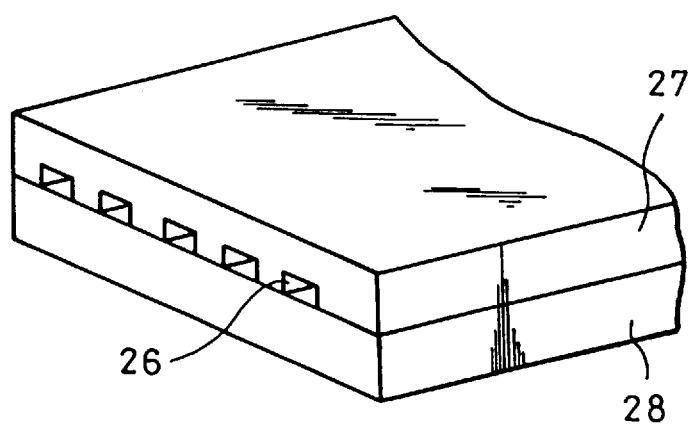
FIG. 5 is a perspective view which illustrates the outline of a multi-head composed of the heads shown in FIG. 3.

An example of the structure of a head, which is the essential portion of the apparatus are shown in FIGS. 3, 4 and 5.

A head 13 is formed by bonding together a glass, ceramic of plastic plate having a groove 14, through which ink flows, and a heating head 15 (although a head is illustrated, the present invention is not limited to this) for use to perform a heat-sensitive recording operation. The heating head 15 comprises a protection film 16 made of silicon oxide or the like, aluminum electrodes 17-1 to 17-2, a heat generating resistor layer 18 made of nichrome or the like, a heat regenerative layer 19 and a substrate 20 made of alumina and exhibiting excellent heat radiation characteristics.

Ink 21 reaches discharge orifices (small apertures) 22 and forms a meniscus 23 with pressure P.

When electric signals are supplied to the electrodes 17-1 and 17-2, a region of the heating head 15 designated by n rapidly generates heat, causing a bubble to be generated in the ink 21 which is in contact with the region n. The pressure of the bubble projects the meniscus 23, the ink 21 is discharged to be formed into a recording droplet 24 by the orifice 22 and flies to the member 25, on which an image will be printed. FIG. 5 illustrates the shape of a multi-head having a multiplicity of heads shown in FIG. 3. The multi-head is manufactured by bringing a glass plate 27 having a multi-groove 26 and the heating head 28 arranged similarly to that shown in FIG. 3 into contact with each other. FIG. 1 is a cross sectional view which illustrates the head 13 along the passage for the ink. FIG. 4 is a cross sectional view taken along line 4—4 of FIG. 3.

Figure 6:
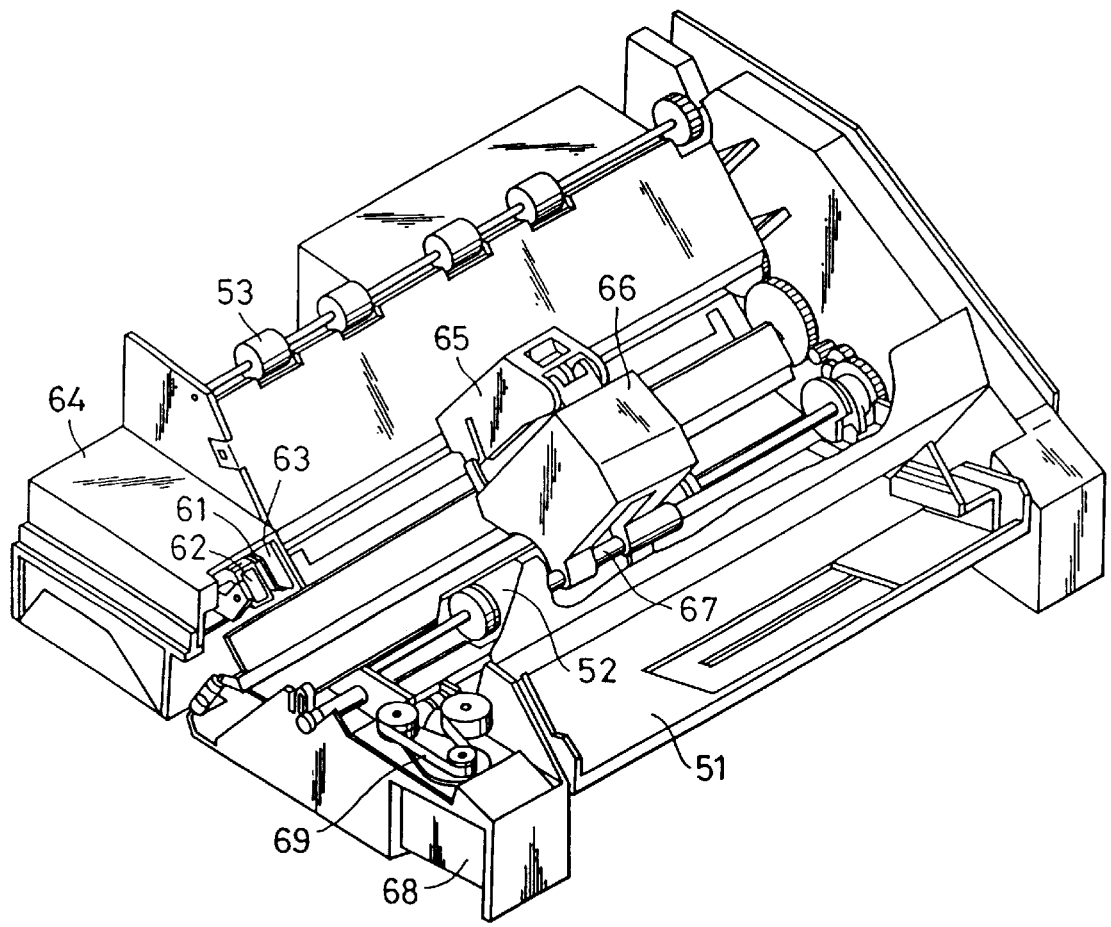
FIG. 6 is a perspective view which illustrates an example of the ink jet recording apparatus.

FIG. 6 illustrate an example of the ink jet recording apparatus including the foregoing head.

Referring to FIG. 6, reference numeral 61 represents a blade serving as a wiping member, the blade 61 having an end which is held by a blade holding member so that the foregoing end is made to be a fixed end. As a result, a cantilever structure is formed. The blade 61 is disposed adjacent to the recording region in which an image is recorded by the recording head. In this embodiment, the blade 61 is so held that it projects into the passage through which the recording head is moved. Reference numeral 62 represents a cap disposed at a home position adjacent to the blade 61, the cap 62 being moved perpendicular to the direction, in which the recording head is moved, to be brought into contact with the surface of a discharge port so that a capping operation is performed. Reference numeral 63 represents an absorber adjacent to the blade 61, the absorber 63 being held while being projecting into the passage, through which the recording head is moved, similarly to the blade 6. The blade 61, the cap 62 and the absorber 63 form a discharge restoring portion arranged such that water and dust on the surface of the discharge port are removed by the blade 61 and the absorber 63.

Reference numeral 65 represents a recording head having a discharge energy generating means; recording head 65 performs a recording operation by discharging ink to a member, on which an image will be printed, the member being positioned to face the surface of a discharge port. Reference numeral 66 represents a carriage having the recording head 65 mounted thereon to move the recording head 65. The carriage 66 is slidably engaged to a guide shaft 67, the carriage 66 having a portion connected (omitted from illustration) to a belt 69 to be driven by a motor 68. As a result, the carriage 66 is able to move along the guide shaft 67 so that the recording head 65 is able to move to the recording region and adjacent regions.

Reference numeral 51 represents a paper feeding portion through which the member, into which an image will be printed, is inserted. Reference numeral 52 represents a paper conveying roller to be rotated by a motor (omitted from illustration). The structure thus-constituted feeds the recording member to a position facing the surface of the discharge port of the recording head. After an image has been printed, the recording member is discharged to a paper discharge portion having a paper discharge roller 53.

In the foregoing structure, the cap 62 of the head restoring portion 64 is removed from the passage for the recording head 65 during the returning movement of the recording head 65 toward the home position because the recording operation has been completed or the other reason. However, the blade 61 is projected into the movement passage. As a result, the surface of the discharge port of the recording head 65 is wiped up. When the cap is brought into contact with the discharging surface of the recording head 65, the cap 62 is moved to project into the movement passage for the recording head 65.

When the recording head 65 is moved from the home position to the recording start position, the cap 62 and the blade 61 are positioned at the same positions as those at the time of the wiping operation. As a result, the surface of the discharge port of the recording head can be wiped.

The movement of the recording head to the home position adjacent to the recording region is also performed at a predetermined interval during the movement of the recording head to the recording region for the purpose of recording an image as well as the movement to be performed at the time of the completion of the recording operation and at the time of the discharge restoring operation. At the time of the foregoing movements, the foregoing wiping operation is performed.

Figure 7:
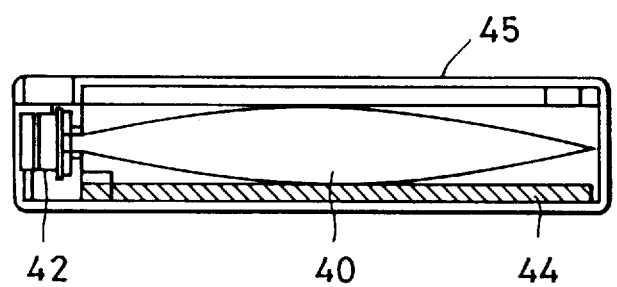
FIG. 7 is a vertical cross sectional view which illustrates an ink cartridge.

FIG. 7 illustrates an example of an ink cartridge which accommodates the ink to be supplied thereto through a tube. Referring to FIG. 7, reference numeral 40 represents an ink accommodating portion, for example, an ink bag which accommodates the ink to be supplied, the ink accommodating portion having a rubber plug 42 at the leading portion thereof. By inserting a needle (omitted from illustration) into the plug 42, the ink in the ink bag 40 can be supplied to the head. Reference numeral 44 represents an absorber for receiving waste ink. It is preferable that the ink accommodating portion has the surfaces, which come in contact with the ink, and which are made of polyolefin, more preferably polyethylene. The ink jet recording apparatus according to the present invention is not limited to the foregoing structure in which the head and the ink cartridge are disposed individually. An ink jet recording apparatus shown in FIG. 8 which comprises an integrated head and the ink cartridge may be employed.

Figure 8:
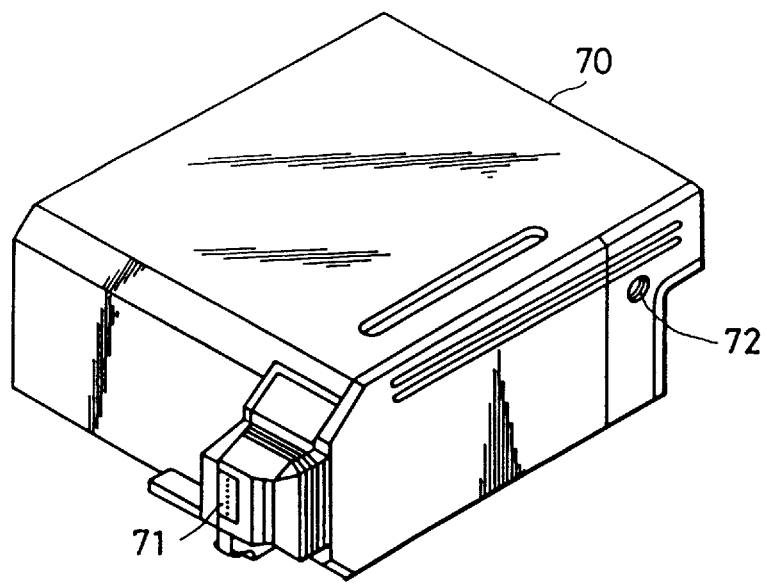
FIG. 8 is a perspective view which illustrates a recording unit.

Referring to FIG. 8, reference numeral 70 represent a recording unit which includes the ink accommodating portion, for example, an ink absorber, that accommodates the ink. Ink in the ink absorber is, as an ink droplet, discharged from a head portion 71 having a plurality of orifices. It is preferable that the ink absorber be made of polyurethane or cellulose or polyvinyl acetal. Reference numeral 72 represents an atmosphere communication port which causes the inside portion of the recording unit to communicate with the atmosphere. The recording unit 70 is used in place of the recording head shown in FIG. 6, the recording unit 70 being detachable from the carriage 66.

EXAMPLES

Examples and Comparative Examples will now be described to explain the present invention further specifically. The term "part" means parts by weight.

Examples 1 to 7 and
Comparative Examples 1 to 10

Components shown in Tables 1-1 and 1-2 were mixed in a beaker, and stirred at 25° C. for 4 hours. The mixture was filtered under pressure by using a membrane filter having a pore size of 0.22 $\mu$m. However, styrene-acrylic acid copolymer was injected into a 70° C. water bath together with amine and water so that its resin component was completely dissolved. As a result, it was formed into a water solution containing 15% by weight of resin component before it was added.

TABLE 1-1

| Ink Composition | | Examples | | | | | | |
|---|---|---|---|---|---|---|---|---|
| | | 1 | 2 | 3 | 4 | 5 | 6 | 7 |
| Dye | C.I. Direct black 154 | 2 | | | | 2 | 2 | 2 |
| | C.I. Food black 2 | 2 | | | | 2 | 2 | 2 |
| | C.I. Direct yellow 86 | | 2 | | | | | |
| | C.I. Direct red 227 | | | 3 | | | | |
| | C.I. Acid blue 9 | | | | 2 | | | |
| Organic solvent. Additive | Glycerol | 5 | 5 | 5 | 5 | 5 | 5 | 3 |
| | Thiodiglycol | 6 | 6 | 6 | 6 | | | |
| | N-methyl-2-pyrrolidone | 5 | 5 | 5 | 5 | 5 | 5 | 5 |
| | Triethylene glycol | | | | | | 5 | |
| | Diethylene glycol | | | | | | | 5 |
| | Isopropyl alcohol | 1 | 1 | 1 | 1 | 2 | 2 | 2 |
| | Monoethanol amine | 0.1 | 0.1 | 0.1 | 0.1 | 0.1 | 0.1 | 0.1 |

TABLE 1-1-continued

| Ink Composition | | Examples | | | | | | |
|---|---|---|---|---|---|---|---|---|
| | | 1 | 2 | 3 | 4 | 5 | 6 | 7 |
| | Acetylenol EH (Kawaken Fine Chemicals) | 0.01 | 0.01 | 0.01 | 0.01 | 0.02 | 0.02 | 0.02 |
| | Urea | | | | | 5 | | |
| Resin | Resin A (*1) | 0.6 | 0.6 | 0.6 | 0.6 | | | |
| | Resin B (*2) | | | | | 0.8 | | |
| | Resin C (*3) | | | | | | 0.9 | |
| | Resin D (*4) | | | | | | | 0.3 |
| | Water | Bal | Bal | Bal | Bal | Bal | Bal | Bal |

Bal: Balance (*1) Resin A: styrene-acrylic acid-ethyl acrylate copolymer, acid number: 190, weight average molecular weight: 9800

(*2) Resin B: styrene-acrylic acid-butyl acrylate copolymer, acid number: 140, weight average molecular weight: 11000

(*3) Resin C: styrene-acrylic acid-ethyl acrylate copolymer, acid number: 140, weight average molecular weight: 5700

(*4) Resin D: styrene-acrylic acid half ester-maleic acid anhydride copolymer, acid number: 190, weight average molecular weight: 15000

TABLE 1-2

| Ink Composition | | Comparative Examples | | | | | | | | | |
|---|---|---|---|---|---|---|---|---|---|---|---|
| | | 1 | 2 | 3 | 4 | 5 | 6 | 7 | 8 | 9 | 10 |
| Dye | C.I. Direct black 154 | 2 | | | | 2 | 2 | 2 | 2 | 2 | 2 |
| | C.I. Food black 2 | 2 | | | | 2 | 2 | 2 | 2 | 2 | 2 |
| | C.I. Direct yellow 86 | | 2 | | | | | | | | |
| | C.I. Direct red 227 | | | 3 | | | | | | | |
| | C.I. Acid blue 9 | | | | 2 | | | | | | |
| Organic solvent. Additive | Glycerol | 5 | 5 | 5 | 5 | 5 | 5 | 3 | | 5 | 5 |
| | Thiodiglycol | 6 | 6 | 6 | 6 | | | | 6 | 6 | 10 |
| | N-methyl-2-pyrrolidone | 5 | 5 | 5 | 5 | 5 | 5 | 5 | 5 | 5 | |
| | Triethylene glycol | | | | | | 5 | 5 | | | |
| | Diethylene glycol | | | | | | | 5 | | | |
| | Isopropyl alcohol | 1 | 1 | 1 | 1 | 2 | 2 | 2 | 10 | | |
| | Monoethanol amine | | | | | | | | | | |
| | Acetylenol EH (Kawaken Fine Chemicals) | 0.01 | 0.01 | 0.01 | 0.01 | 0.02 | 0.02 | 0.02 | | | |
| | Urea | | | | | | 5 | 5 | | | |
| Resin | Resin A (*1) | | | | | | | | | | |
| | Resin B (*2) | | | | | | | | | | |

TABLE 1-2-continued

| Ink | Comparative Examples | | | | | | | | | |
|---|---|---|---|---|---|---|---|---|---|---|
| Composition | 1 | 2 | 3 | 4 | 5 | 6 | 7 | 8 | 9 | 10 |
| Resin C (*3) | | | | | | | | | | |
| Resin D (*4) | | | | | | | | | | |
| Water | Bal | Bal | Bal | Bal | Bal | Bal | Bal | Bal | Bal | Bal | discharging ink by the effect of heat energy were used to perform printing on plain paper (PPC-SK-paper manufactured by Canon) to evaluate the fixation, OD, bleeding resistance, quality of the printed image, fixing characteristic, discharge stability, discharge speed, frequency response, and initial discharge characteristics. Further, the following referential factors were measured: bleeding ratio, surface tension of the ink, viscosity and the forward contact angle. The results are shown in Tables 2-1 and 2-2.

The evaluation methods and the criterion are as follows:

(1) Fixation

Alphabets and numbers were printed on the SK paper and the formed images were rubbed with a filter paper (No. 2 manufactured by Toyo) after 10, 20, 30, 40, 50 and 60 seconds had passed. The evaluation was made depending upon the seconds at which the contamination of the printed portion was prevented (at 20°±5° C. and 50±10% RH).

A: 15 seconds or shorter, B: 16 to 30 seconds,

C: 31 seconds or longer (2) OD

Solid image was printed on the SK paper, and then the printed article was allowed to stand at atmospheric temperature and humidity for 24 hours or longer. The printed portion was measured with a Macbeth density meter (RD918) so that the value of the OD was evaluated.

A: more than 1.2, B: 1.0 to 1.2, C: less than 1.0

(3) Bleeding Resistance

A yellow solid image was printed on the SK paper, and alphabets and numbers were printed within the yellow image, and then the printed article was allowed to stand at the atmospheric temperature and humidity for one or more hours. Then, bleeding occurring in the dot level and the sharpness of the edge were evaluated.

A: no bleeding was observed and a sharp edge was formed.

B: some bleeding was observed, and edge was not sharp

C: bled excessively and dots and edges were not sharp (4) Quality of Printed Image Alphabets and numbers were printed on the SK paper, and the printed article was allowed to stand for one hour or longer, and then bleeding in the dot level and the dot sharpness were evaluated under the atmospheric conditions 25° C. and 60% RH.

A: no bleeding was observed and a sharp edge was formed.

B: some bleeding was observed, and edge was not sharp

C: bled excessively and dots and edges were not sharp (5) Fixing Characteristics A predetermined ink was charged into the printer, and alphabets and numbers were continuously printed for 10 minutes. Then, the printing operation was stopped and the printer was allowed to stand for 30 days while putting a cap on the printer (conditions: 60° C. and 10±5% RH). Then, alphabets and numbers were again printed to evaluate the characteristics depending upon the number of restoring operations taken to restore the initial printing quality.

A: printing equivalent to the initial stage was possible without restoring operation B: printing equivalent to the initial stage was possible after 1 to 5 restoring operations were performed C: printing equivalent to the initial stage was possible after 6 to 10 restoring operations were performed D: printing equivalent to the initial stage was possible after 10 or more restoring operations were performed (6) Discharge Stability, Discharge Speed and Frequency Response Canon ink jet recording head evaluation apparatus CADAS (an apparatus comprising a strobe, a microscope, a camera and a monitor to observe the discharge, the present invention is not limited to this if the employed apparatus has the same performance) was used to measure the scatter of the discharge speed, the discharge speed and the frequency response depending upon the ink under the same conditions as those under which the head of the printer is driven.

(6)-1 Discharge Stability

The CADAS was used to measure the discharge speed 30 times at 4 KHz, and the standard deviation of the results was used to evaluate the discharge stability.

A: 0 to 0.5 m/s, B: 0.5 to 1.0 m/s, C: 1.0 m/s or higher (6)-2 Discharge Speed

The CADAS was used to measure the discharge speed 30 times at 4 KHz, and the average of the results was used to evaluate the discharge speed.

A: 7 to 15 m/s, B: 5 to 7 m/s, C: 5 m/s or lower (6)-3 Frequency Response

The ink was discharged at a drive frequency of 0.1 KHz by the CADAS, and the frequency was gradually raised to measure the frequency, with which the discharge was made unstable such that the discharged shape has no main droplet but it is formed into a sharp shape, was measured and evaluated.

A: 4 KHz or higher, B: 2 to 4 KHz, C: 2 KHz or lower (7) Initial Discharge Characteristics The ink was discharged in an atmosphere such that the temperature was 15° C. and the humidity was 10% RH, and then no cap was put for a predetermined time, and the ink was again discharged. The state of the first several droplets again discharged were observed to evaluate the initial discharge characteristics depending upon the time in which excellent discharge state was maintained.

A: longer than 30 seconds, B: 20 to 30 seconds, C: 5 to 20 seconds, D: shorter than 5 seconds (8) Bleeding ratio 200,000 droplets were discharged and the quantity required at this time was measured from the weight of the ink bag. The weight per droplet was calculated, and the result was divided by the specific gravity of the ink so that the volume per one droplet was calculated. An assumption was made that the ink droplet was formed into a sphere. The diameter of the sphere corresponding to the foregoing volume was calculated and the result was made to be the diameter of the droplet. The diameter of the droplet thus obtained and the diameter of the dot, which was the diameter of the dot printed on the SK paper, were used to calculate the bleeding ratio.

Bleeding ratio=dot diameter/droplet diameter (9) Surface Tension

A Kyowa-CBVP surface tension meter A-1 (manufactured by Kyowa) was used to measure the surface tension realized at 25° C.

(10) Forward Contact Angle (by a drop method)

A contact-angle measuring apparatus CA-TYPE (manufactured by Kyowa Interfacial Science) was used such that the ink was ejected from a syringe to cause the droplet to have a diameter of 2.8 mm. The droplet thus ejected was brought into contact with the SK paper to transfer the ink, and then the paper was inclined to first obtain the angle at which the droplet drops. Then, the lower angle (the forward angle) of the drop angles made by the interface between the ink and the paper surface was measured and the result was made to be the forward contact angle at 25° C.

(11) Viscosity

An E-type viscosity meter VISCONIC ELD (manufactured by Tokyo Keiki) was used to measure the viscosity realized at 25° C.

TABLE 2-1

| Factors | Examples | | | | | | |
|---|---|---|---|---|---|---|---|
| | 1 | 2 | 3 | 4 | 5 | 6 | 7 |
| (a) Fixation | A | A | A | A | A | A | A |
| (b) OD | A | A | A | A | A | A | A |
| (c) Bleeding resistance | A | A | A | A | A | A | A |
| (d) Quality of printed image | A | A | A | A | A | A | A |
| (e) Fixing characteristics | A | A | A | A | A | A | A |
| (f) Discharge stability | A | A | A | A | A | A | A |
| (g) Discharge speed | A | A | A | A | A | A | A |
| (h) Frequency response | A | A | A | A | A | A | A |
| (i) Initial discharge characteristics | A | A | A | A | A | A | A |
| (j) Bleeding ratio | 2.7 | 2.7 | 2.8 | 2.7 | 2.8 | 2.9 | 2.8 |
| (k) Surface tension | 37 | 37 | 38 | 36 | 35 | 34 | 33 |
| (l) Forward contact angle | 110 | 110 | 110 | 110 | 120 | 130 | 90 |
| (m) Viscosity | 2.1 | 2.0 | 2.0 | 2.0 | 1.8 | 2.1 | 2.4 |

Note) surface tension×$10^{-5}$ N/cm, Viscosity×$10^{-3}$ Pa·s

TABLE 2-2

| Factors | Comparative Examples | | | | | | | | | |
|---|---|---|---|---|---|---|---|---|---|---|
| | 1 | 2 | 3 | 4 | 5 | 6 | 7 | 8 | 9 | 10 |
| (a) Fixation | B | B | B | B | B | B | C | A | A | C |
| (b) OD | C | C | C | C | C | C | B | C | C | B |
| (c) Bleeding resistance | C | C | C | C | C | C | C | C | C | C |
| (d) Quality of printed image | A | A | A | A | A | A | C | C | C | A |
| (e) Fixing characteristics | A | A | A | A | A | A | A | D | A | D |
| (f) Discharge stability | A | A | A | A | A | A | A | A | A | C |
| (g) Discharge speed | A | A | A | A | A | A | A | A | A | C |
| (h) Frequency response | A | A | A | A | A | A | A | C | A | C |
| (i) Initial discharge characteristics | A | A | A | A | A | A | A | C | C | A |
| (j) Bleeding ratio | 2.2 | 2.2 | 2.3 | 2.2 | 2.3 | 2.3 | 2.2 | 3.0 | 3.2 | 2.2 |
| (k) Surface tension | 50 | 50 | 50 | 49 | 47 | 46 | 47 | 32 | 25.5 | 51 |
| (l) Forward contact angle | 100 | 100 | 100 | 100 | 100 | 110 | 100 | 30 | 40 | 120 |
| (m) Viscosity | 2.0 | 1.9 | 1.9 | 1.9 | 1.7 | 2.0 | 2.3 | 2.2 | 3.0 | 1.7 |

Four types of color inks according to Examples 1 to 4 were charged into the foregoing ink jet printer, and full color images were formed on plain paper SK, high quality color images were obtained without bleeding between different colors.

The foregoing inks were charged into the ink cartridge shown in FIG. 7 and the recording unit shown in FIG. 8, and the foregoing units were reserved for three months. Then, the inks were charged into the printers to perform the recording operation. As a result, clogging of the orifices were prevented and excellent recording operations were performed.

Examples 9 to 15

The compositions shown in Table 3 were employed to prepare the ink similarly to Examples 1 to 7 to evaluate the foregoing factors. The results are shown in Table 5. The composition of the resins are shown in Table 4.

The pH of the ink realized at 25° C. was measured by using a pH meter F-11 (manufactured by Horiba).

TABLE 3

| Ink Composition | | 9 | 10 | 11 | 12 | 13 | 14 | 15 |
|---|---|---|---|---|---|---|---|---|
| Dye | C.I Food Black 2 | 3 | | | | | | |
| | C.I. Acid Blue 9 | | 2 | 2 | 2 | 2 | 2 | 2 |
| Organic Solvent | Glycerol | 5 | 5 | 7 | 5 | 5 | 5 | 3 |
| | Thiodiglycol | 9 | 7 | | | | | |
| | N-methyl-2-pyrrolidone | 7 | 5 | | | 5 | 5 | 5 |
| Additive | Ethylene glycol | | | 10 | | | 5 | 5 |
| | Diethylene glycol | | | | 12 | | | 5 |
| | Triethylene glycol | | | | | 2 | 2 | 2 |
| | Monoethanol amine | 0.13 | 0.17 | 0.14 | 0.14 | 0.14 | 0.17 | 0.13 |
| | Acethylenol EH | 0.05 | 0.05 | 0.1 | 0.1 | 0.1 | 0.1 | 0.05 |
| Resin | Resin E | 0.6 | | | | | | 0.6 |
| | Resin F | | 0.6 | | | | | |
| | Resin G | | | 1.0 | | | | |
| | Resin H | | | | 0.5 | | | |
| | Resin I | | | | | 2.2 | | |
| | Resin J | | | | | | 0.6 | |
| | Water | Bal | Bal | Bal | Bal | Bal | Bal | Bal |

TABLE 4

| Factors to be Evaluated | Resin E | Resin F | Resin G | Resin H | Resin I | Resin J |
|---|---|---|---|---|---|---|
| Styrene | 60 | 53 | 50 | 59 | 39 | 33 |
| α-methylstyrene | | | 10 | | 20 | 10 |
| Acrylic acid | 20 | 27 | 29 | 29 | 29 | 29 |
| Ethyl acrylate | 20 | 20 | | 12 | 12 | |
| Butyl acrylate | | | 11 | | | |
| Butyl methacrylate | | | | | | 28 |
| Acid number | 138 | 210 | 210 | 210 | 210 | 210 |
| Weight average molecular weight | 5000 | 10000 | 20000 | 18000 | 15500 | 19000 |

TABLE 5

| Factors | 9 | 10 | 11 | 12 | 13 | 14 | 15 |
|---|---|---|---|---|---|---|---|
| (a) Fixation | A | A | A | A | A | A | A |
| (b) OD | A | A | A | A | A | A | A |
| (c) Bleeding resistance | A | A | A | A | A | A | A |
| (d) Quality of printed image | A | A | A | A | A | A | A |
| (e) Fixing characteristics | A | A | B | B | B | A | A |
| (f) Discharge stability | A | A | A | A | A | A | A |
| (g) Discharge speed | A | A | A | A | A | A | A |
| (h) Frequency response | A | A | A | A | A | A | A |
| (i) Initial discharge characteristics | A | A | A | A | A | A | A |
| (j) Surface tension | 38 | 38 | 37 | 37 | 37 | 37 | 38 |
| (k) pH | 9.3 | 9.4 | 9.6 | 9.6 | 9.3 | 9.5 | 9.4 |
| (l) Viscosity | 2.3 | 1.9 | 1.9 | 1.9 | 1.7 | 2.0 | 2.3 |
| (m) Forward contact angle | 100 | 100 | 110 | 110 | 110 | 110 | 100 |

Examples 16 to 22

The compositions shown in Table 6 were employed, and ink was prepared similarly to Examples 1 to 7 to make evaluations similarly. The results are shown in Table 7. The resin similar to that shown in Table 4 was employed.

A novel factor, ink reservation, was added.

(12) Reservation

Ink was charged in a heat-proof and thread mouthed bottle (Duran 50-glass manufactured in West Germany) and reserved in a 60° C. constant-temperature tank, and taken out one, two and three months.

A: ink was not denatured after 3 months had passed

B: ink was denatured after 3 months had passed

C: ink was denatured after 2 months had passed

D: ink was denatured after 1 months had passed

TABLE 6

| Ink Composition | | 16 | 17 | 18 | 19 | 20 | 21 | 22 |
|---|---|---|---|---|---|---|---|---|
| Dye | C.I Food Black 2 | 3 | | | | | | |
| | C.I. Acid Blue 9 | | 2 | 2 | 2 | 2 | 2 | 2 |
| Organic Solvent | Glycerol | | | | | 2 | | |
| | Thiodiglycol | 20 | 30 | 20 | 20 | 15 | 30 | 1 |
| | Ethylene glycol | 10 | | | | | | 5 |
| Additive | Diethylene glycol | | 5 | | | | | |
| | Polyethylene glycol 200 | | | 10 | | | | |
| | Polyethylene glycol 600 | | | | 5 | 5 | | 12 |
| | Triethylene glycol | | | | | | 1 | |

TABLE 6-continued

| Ink Composition | Examples | | | | | | |
|---|---|---|---|---|---|---|---|
| | 16 | 17 | 18 | 19 | 20 | 21 | 22 |
| Monoethanol amine | 0.13 | 0.13 | 0.17 | 0.17 | 0.17 | 0.13 | 0.13 |
| Isopropyl alcohol | | 3 | 1 | 2 | 2 | 1 | 1 |
| Acethylenol EH | 0.10 | | 0.1 | 0.1 | 0.1 | 0.1 | 0.05 |
| Resin  Resin E | 0.6 | 0.6 | | | | 0.6 | 0.6 |
| Resin G | | | 0.5 | | | | |
| Resin I | | | | 0.6 | 0.5 | | |
| Water | Bal | Bal | Bal | Bal | Bal | Bal | Bal |

TABLE 7

| Factors | Examples | | | | | | |
|---|---|---|---|---|---|---|---|
| | 16 | 17 | 18 | 19 | 20 | 21 | 22 |
| (a) Fixation | A | A | A | A | A | A | A |
| (b) OD | A | A | A | A | A | A | A |
| (c) Bleeding resistance | A | A | A | A | A | A | |
| (d) Quality of printed image | A | A | A | A | A | A | A |
| (e) Fixing characteristics | A | A | B | B | B | A | A |
| (f) Discharge stability | A | A | A | A | A | A | A |
| (g) Discharge speed | A | A | A | A | A | A | A |
| (h) Frequency response | A | A | A | A | A | A | A |
| (i) Initial discharge characteristics | A | A | A | A | A | A | B |
| (j) Reservation | A | A | A | A | B | A | A |
| (k) Surface tension | 38 | 38 | 37 | 37 | 37 | 37 | 38 |
| (l) pH | 9.3 | 9.4 | 9.6 | 9.6 | 9.3 | 9.5 | 9.4 |
| (m) Viscosity | 2.3 | 1.9 | 1.9 | 1.9 | 1.9 | 1.9 | 1.9 |
| (n) Forward contact angle | 120 | 100 | 110 | 100 | 100 | 110 | 110 |

As described above, use of the ink according to the present invention causes the ink droplet to properly extend in the lateral direction on the surface of plain paper while preventing irregular bleeding. Further, ink cannot easily penetrate the paper in the direction of the depth of the paper. Therefore, the recording density can be raised, drying can quickly be completed, high quality can be realized in the printed image and the reliability can be improved. As a result, generation of bleeding can be prevented.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A method of decreasing bleeding in ink jet recording comprising the steps of:
   (1) selecting an ink consisting essentially of
      a water-soluble dye;
      a liquid medium for dissolving said dye;
      an alkali-soluble styrene-acrylic acid copolymer; and
      a solvent selected from the group consisting of thiodiglycol, sulforane and dimethylsulfoxide; and
      a solvent for improving fixation, wherein
      a surface tension and viscosity of said ink respectively are $26 \times 10^{-5}$ N/cm to $40 \times 10^{-5}$ N/cm and $0.7 \times 10^{-3}$ Pa·s to $12 \times 10^{-3}$ Pa·s, and a forward contact angle with respect to a recording medium, on which an image will be printed, ranges from 60° to 180° at 25° C.;
   (2) jetting a plurality of droplets of said ink to the recording medium; and
   (3) forming an image on the recording medium with said plurality of droplets, wherein each droplet has a D/h ratio of not less than 6, where D is the diameter of the droplet and h is the penetration distance of the droplet in a direction of the depth of the recording medium.

2. A method according to claim 1, wherein the forward contact angle ranges from 90° to 180° at 25° C.

3. A method according to claim 1, wherein the viscosity ranges from $1 \times 10^{-3}$ Pa·s to $4 \times 10^{-3}$ Pa·s.

4. A method according to claim 1, wherein the surface tension ranges from $30 \times 10^{-5}$ N/cm to $40 \times 10^{-5}$ N/cm.

5. A method according to claim 1, wherein the weight average molecular weight of said alkali-soluble styrene-acrylic acid copolymer ranges from 3000 to 50000.

6. A method of decreasing bleeding in ink jet recording comprising the steps of:
   (1) selecting an ink consisting essentially of
      a water-soluble dye; and
      a liquid medium for dissolving or dispersing said dye, where said liquid medium comprises (a) an alkali-soluble styrene-acrylic acid copolymer comprising 0.01 to 5.0% by weight of the overall weight of said ink, (b) a basic substance, (c) a polyhydric alcohol, (d) a solvent selected from the group consisting of thiodiglycol, sulforane and dimethylsulfoxide, (e) water, and (f) a solvent for improving fixation, wherein a surface tension and a viscosity of said ink respectively are $26 \times 10^{-5}$ N/cm to $40 \times 10^{-5}$ N/cm and $0.7 \times 10^{-3}$ Pa·s to $12 \times 10^{-3}$ Pa·s, and a forward contact angle with respect to a recording medium, on which an image will be printed, ranges from 60° to 180° at 25° C.;
   (2) jetting a plurality of droplets of said ink to the recording medium; and
   (3) forming an image on the recording medium with said plurality of droplets, wherein each droplet has a D/h ratio of not less than 6, where D is the diameter of the droplet and h is the penetration distance of the droplet in a direction of the depth of the recording medium.

7. A method of decreasing bleeding in ink jet recording comprising the steps of:
   (1) selecting an ink consisting essentially of
      a water-soluble dye; and
      a liquid medium for dissolving or dispersing said dye, said liquid medium comprising (a) an alkali-soluble styrene-acrylic acid copolymer comprising 0.01 to 5.0% by weight based on the total weight of said ink, (b) a basic substance, (c) a glycol comprising 1 to 50% by weight based on the total weight of said ink, (d) sulfur-containing organic solvent comprising 1 to 50% by weight based on the total weight of said ink, (e) water, and (f) a solvent for improving fixation, wherein a surface tension and a viscosity of said ink respectively are $26 \times 10^{-5}$ N/cm to $40 \times 10^{-5}$ N/cm and $0.7 \times 10^{-3}$ Pa·s to $12 \times 10^{-3}$ Pa·s, and a forward contact angle with respect to a recording medium, on which an image will be printed, ranges from 60° to 180° at 25° C.;

(2) jetting a plurality of droplets of said ink to the recording medium; and (3) forming an image on the recording medium with said plurality of droplets, wherein each droplet has a D/h ratio of not less than 6, where D is the diameter of the droplet and h is the penetration distance of the droplet in a direction of the depth of the recording medium.

8. A method according to claim 7, wherein said sulfur-containing organic solvent comprises a solvent selected from a group consisting of thiodiglycol, sulforan and dimethylsulfoxide.

9. A method according to claim 6, wherein said alkali-soluble styrene-acrylic acid copolymer comprises 0.01 to 2.0% by weight of the overall weight of said ink.

10. A method according to claim 6, wherein said alkali-soluble styrene-acrylic acid copolymer comprises 0.1 to 0.9% by weight of the overall weight of said ink.

11. A method according to claim 6, wherein said alkali-soluble styrene-acrylic acid copolymer has an acid number ranging from 100 to 250.

12. A method according to claim 6, wherein said alkali-soluble styrene-acrylic acid copolymer has an acid number ranging from 130 to 210.

13. A method according to claim 6, wherein said alkali-soluble styrene-acrylic acid copolymer has a weight average molecular weight ranging from 3000 to 50000.

14. A method according to claim 6, wherein said-alkali-soluble styrene-acrylic acid copolymer has a weight average molecular weight ranging from 4000 to 20000.

15. A method according to claim 6, wherein-said water comprises from 70 to 95% of the overall weight of said ink.

16. A method according to claim 6, said ink further comprising pyrrolidone.

17. A method according to claim 6, said ink further comprising a surface active agent.

18. A method according to claim 6, wherein said polyhydric alcohol comprises two or more types of solvents.

19. A method according to claim 6, said ink having a pH that ranges from 8 to 11.

20. A method according to claim 7, wherein said alkali-soluble styrene-acrylic acid copolymer comprises 0.01 to 2.0% by weight of the overall weight of said ink.

21. A method according to claim 7, wherein said alkali-soluble styrene-acrylic acid copolymer comprises 0.1 to 0.9% by weight of the overall weight of said ink.

22. A method according to claim 7, wherein said alkali-soluble styrene-acrylic acid copolymer has an acid number ranging from 100 to 250.

23. A method according to claim 7, wherein said alkali-soluble styrene-acrylic acid copolymer has an acid number ranging from 130 to 210.

24. A method according to claim 7, wherein said alkali-soluble styrene-acrylic acid copolymer has a weight average molecular weight ranging from 3000 to 50000.

25. A method according to claim 7, wherein said alkali-soluble styrene-acrylic acid copolymer has a weight average molecular weight ranging from 4000 to 20000.

26. A method according to claim 7, wherein said water comprises 70 to 95% of the overall weight of said ink.

27. A method according to claim 7, further comprising a surface active agent.

28. A method according to claim 7, said ink having a pH that ranges from 8 to 11.

* * * * *

UNITED STATES PATENT AND TRADEMARK OFFICE
CERTIFICATE OF CORRECTION

PATENT NO. : 5,849,815
DATED : December 15, 1998
INVENTOR(S) : Makoto Aoki et al.

It is certified that error appears in the above-identified patent and that said Letters Patent is hereby corrected as shown below:

Title page,
Item [56], References Cited, U.S. PATENT DOCUMENTS, right column, "Kurabauyashi et al." should read -- Kurabayashi et al. -- and "Tarizawa et al." should read -- Takizawa et al. --.
FOREIGN PATENT DOCUMENTS, "4170478" should read -- 4-170478 --.
OTHER PUBLICATIONS, "81-95631D for JP-A-145962." should read -- 81-95631D for JP-A-56-145962. -- and "92-254006 for JP-A-170478." should read -- 92-254066 for JP-A-4-170478. --.
*Assistant Examiner,* "Alga" should read -- Olga --.

Column 2,
Line 47, "weight a" should read -- weight, a --.

Column 3,
Line 11, "be" should be deleted.
Line 54, "can" should read -- can be --.

Column 4,
Line 26, "Ws=γs-γLs-γL" should read -- Ws=γs-γsL-γL --.
Line 62, "h={r·γ·cos θ·t/ (2η) }$^{1/2}$" should read -- h={ (r·γ·cos θ·t / (2η) } $^{1/2}$ --.

Column 5,
Line 2, "θ: viscosity" should read -- η: viscosity --.
Line 23, "insufficient" should read -- insufficient. --.
Line 28, "0.7x10-3" should read -- 0.7x10$^{-3}$ --.

Column 6,
Line 4, "can" should read -- can be --.
Line 9, "alkalisoluble" should read -- alkali-soluble --.

Column 7,
Line 4, "ink by" should read -- ink at --.
Line 25, "at by" should read -- at --.
Line 32, "serves" should read -- serve --.
Line 59, "compound" should read -- compounds --.

UNITED STATES PATENT AND TRADEMARK OFFICE
CERTIFICATE OF CORRECTION

PATENT NO.    : 5,849,815
DATED         : December 15, 1998
INVENTOR(S)   : Makoto Aoki et al.

It is certified that error appears in the above-identified patent and that said Letters Patent is hereby corrected as shown below:

Column 8,
Line 3, "weight," should read -- weight --.
Line 49, "1,3-dimethyl-2imidazolidinone;" should read -- 1,3-dimethyl-2-imidazolidinone; --.

Column 10,
Line 9, "T he" should read -- The --.
Line 54, "discharge" should read -- discharging --.
Line 64, "are" should read -- , is --.

Column 11,
Line 26, "illustrate" should read -- illustrates --.
Line 43, "projecting" should read -- projected --.

Column 12,
Line 42, "represent" should read -- represents --.

Column 15,
Line 11, "discharging" should read -- The foregoing ink and ink jet printer (resolution: 360 DIP and ink discharge amount: 40 pl) manufactured by Canon for discharging --.

Column 18,
Line 32, "Note)" should read -- Note: --.

Column 19,
Line 11, "were" (first occurrence) should read -- was --.

UNITED STATES PATENT AND TRADEMARK OFFICE
CERTIFICATE OF CORRECTION

PATENT NO. : 5,849,815
DATED : December 15, 1998
INVENTOR(S) : Makoto Aoki et al.

It is certified that error appears in the above-identified patent and that said Letters Patent is hereby corrected as shown below:

Column 20
Line 47, "months" should read -- month --.

Column 21,
Line 53, "particularly," should read -- particularity --.

Column 23,
Line 27, "said-alkali-" should read -- said alkali- --.
Line 30, "wherein-said" should read -- wherein said --.

Signed and Sealed this

Twenty-seventh Day of August, 2002

Attest:

JAMES E. ROGAN
*Attesting Officer*  *Director of the United States Patent and Trademark Office*